(12) United States Patent
Bennett et al.

(10) Patent No.: US 7,704,155 B2
(45) Date of Patent: Apr. 27, 2010

(54) METAL WOOD CLUB

(75) Inventors: Thomas Orrin Bennett, Carlsbad, CA (US); Christopher D. Harvell, Escondido, CA (US); Stephen S. Murphy, Carlsbad, CA (US); Eddie G. Perez, Carlsbad, CA (US); Michael Scott Burnett, Carlsbad, CA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 11/850,719

(22) Filed: Sep. 6, 2007

(65) Prior Publication Data

US 2008/0119302 A1 May 22, 2008

Related U.S. Application Data

(63) Continuation-in-part of application No. 11/560,905, filed on Nov. 17, 2006, now abandoned.

(51) Int. Cl.
*A63B 53/04* (2006.01)
(52) U.S. Cl. .................. 473/245; 473/248; 473/328
(58) Field of Classification Search .............. 473/292, 473/328, 314, 245, 248
See application file for complete search history.

(56) References Cited

U.S. PATENT DOCUMENTS

| | | | |
|---|---|---|---|
| 1,091,231 A | 3/1914 | Millar | |
| 1,096,359 A | 5/1914 | Dwight | |
| 1,133,129 A | 3/1915 | Govan | |
| 1,167,387 A | 1/1916 | Daniel | |
| 1,467,435 A | 9/1923 | Kinnear | |
| 1,575,364 A | 3/1926 | Hodgkins | |
| 1,840,924 A | 1/1932 | Tucker | |
| 2,750,194 A | 6/1956 | Clark | |
| 3,064,980 A | 11/1962 | Steiner | |
| D213,382 S | * 2/1969 | Risher | ........... D21/733 |
| 3,595,577 A | * 7/1971 | Hodge | ........... 473/314 |
| 3,606,327 A | 9/1971 | Gorman | |
| 3,794,328 A | 2/1974 | Gordon | |
| 3,897,066 A | 7/1975 | Belmont | |
| 3,979,123 A | 9/1976 | Belmont | |
| 4,195,842 A | 4/1980 | Coleman | |
| 4,498,673 A | * 2/1985 | Swanson | ........... 473/328 |
| 4,671,513 A | * 6/1987 | Swanson | ........... 473/328 |
| 4,679,791 A | * 7/1987 | Hull | ........... 473/201 |
| 4,732,389 A | 3/1988 | Kobayashi | |
| 4,754,977 A | 7/1988 | Sahm | |
| 4,811,949 A | 3/1989 | Kobayashi | |
| 4,869,507 A | 9/1989 | Sahm | |
| 4,944,515 A | 7/1990 | Shearer | |
| 5,176,383 A | 1/1993 | Duclos | |
| 5,547,427 A | 8/1996 | Rigal et al. | |

(Continued)

*Primary Examiner*—Stephen L. Blau
(74) *Attorney, Agent, or Firm*—Kristin D. Wheeler

(57) ABSTRACT

In one embodiment, a golf club head is presented having a sole with three recessed cavities for attachment to a hosel-bending tool. In another embodiment, a golf club head is presented having a sole that includes one predetermined contact area proximal to the toe edge of the sole. In another embodiment, a golf club head is presented having a sole in which pads of material are incorporated that may be milled to vary the relief of the sole and to modify mass characteristics of the club head. Yet another embodiment presents a golf club head having a body with a cavity to receive a cartridge that has a constant density and weight.

5 Claims, 14 Drawing Sheets

U.S. PATENT DOCUMENTS

| | | | |
|---|---|---|---|
| 5,570,886 A | 11/1996 | Rigal et al. | |
| 5,586,948 A | 12/1996 | Mick | |
| 5,788,585 A * | 8/1998 | Jackson | 473/292 |
| 5,803,830 A | 9/1998 | Austin et al. | |
| 5,851,160 A * | 12/1998 | Rugge et al. | 473/349 |
| 5,888,148 A | 3/1999 | Allen | |
| 5,989,134 A | 11/1999 | Antonious | |
| 6,123,627 A | 9/2000 | Antonious | |
| 6,190,267 B1 * | 2/2001 | Marlowe et al. | 473/314 |
| 6,458,044 B1 | 10/2002 | Vincent et al. | |
| 6,471,601 B1 | 10/2002 | McCabe et al. | |
| 6,494,790 B1 * | 12/2002 | Toyota et al. | 473/345 |
| 6,645,085 B2 | 11/2003 | McCabe et al. | |
| 6,648,772 B2 | 11/2003 | Vincent et al. | |
| 6,648,773 B1 | 11/2003 | Evans | |
| 2002/0137576 A1 | 9/2002 | Dammen | |
| 2005/0059505 A1 * | 3/2005 | Montalembert | 473/230 |
| 2005/0096151 A1 | 5/2005 | Hou et al. | |
| 2005/0108865 A1 * | 5/2005 | Yabu | 29/428 |
| 2005/0272523 A1 | 12/2005 | Atkins, Sr. | |
| 2006/0089206 A1 | 4/2006 | Lo | |

* cited by examiner

SECTION B-B

SECTION C-C

SECTION D-D

METAL WOOD CLUB

RELATED APPLICATIONS

This application is a continuation-in-part of U.S. application Ser. No. 11/560,905, filed on Nov. 17, 2006 now abandoned, which is incorporated by reference herein in its entirety.

FIELD OF THE INVENTION

The present invention relates to an improved golf club. More particularly, the present invention relates to a wood-type golf club head with improved physical attributes.

BACKGROUND

Golf club heads come in many different forms and makes, such as wood- or metal-type (including drivers and fairway woods), iron-type (including wedge-type club heads), utility- or specialty-type, and putter-type. Each of these styles has a prescribed function and make-up. The present invention relates primarily to hollow golf club heads, such as wood-type and utility-type (generally referred to herein as wood-type golf clubs).

Wood-type or metal-type golf club heads generally include a front or striking face, a crown, a sole and an arcuate skirt including a heel, a toe and a back. The crown and skirt are sometimes referred to as a shell. The front face interfaces with and strikes the golf ball. A plurality of grooves, sometimes referred to as "score lines," may be provided on the face to assist in imparting spin to the ball and for decorative purposes. The crown is generally configured to have a particular look to the golfer and to provide structural rigidity for the striking face. The sole of the golf club is particularly important to the golf shot because it contacts and interacts with the ground during the swing.

The complexities of golf club design are well known. The specifications for each component of the club (i.e., the club head, shaft, grip, and subcomponents thereof) directly impact the performance of the club. Thus, by varying the design specifications, a golf club can be tailored to have specific performance characteristics.

The design and manufacture of wood-type club heads requires careful attention to club head construction. Among the many factors that must be considered are material selection, material treatment, structural integrity and overall geometrical design. Exemplary geometrical design considerations include loft, lie, face angle, horizontal face bulge, vertical face roll, face size, center of gravity, sole curvature, and overall head weight. The interior design of the club head may be tailored to achieve particular characteristics, such as by including hosel or shaft attachment means, perimeter weighting on the face or body of the club head, and fillers within hollow club heads. Club heads are typically formed from stainless steel, aluminum, or titanium and are cast, stamped, as by forming sheet metal with pressure, forged, or formed by a combination of any two or more of these processes.

The club heads may be formed from multiple pieces that are welded or otherwise joined together to form a hollow head, as is often the case of club heads designed with inserts, such as soleplates or crown plates. The multi-piece constructions facilitate access to the cavity formed within the club head, thereby permitting the attachment of various other components to the head such as internal weights and the club shaft. The cavity may remain empty, or may be partially or completely filled, such as with foam. An adhesive may be injected into the club head to provide the correct swing weight and to collect and retain any debris that may be in the club head. In addition, due to difficulties in manufacturing one-piece club heads to high dimensional tolerances, the use of multi-piece constructions allows the manufacture of a club head to a tight set of standards.

Players generally seek a metal wood driver and golf ball combination that delivers maximum distance and landing accuracy. The distance a ball travels after impact is dictated by the magnitude and direction of the ball's translational velocity and the ball's rotational velocity or spin. Environmental conditions, including atmospheric pressure, humidity, temperature, and wind speed, further influence the ball's flight. However, these environmental effects are beyond the control of the golf equipment manufacturer. Golf ball landing accuracy is driven by a number of factors as well. Some of these factors are attributed to club head design, such as center of gravity, moment of inertia and club face flexibility.

Known methods to enhance the weight distribution of wood-type club heads to help reduce the club from being open upon contact with the ball usually include the addition of weights to the club body. These weight elements are usually placed at specific locations, which will have a positive influence, such as increasing moment of inertia or lowering center of gravity, on the flight of the ball or to overcome a particular golfer's shortcomings.

In addition to seeking to optimize the mass characteristics of club heads, players—most often highly skilled amateurs and tour professionals—may choose to customize the lie and loft angles of their clubs. See e.g., U.S. Pat. Nos. 6,260,250; 6,186,903 and 6,483,101. To achieve a more precise fit, the geometrical design of the club is altered by bending the hosel, thereby changing the orientation the of the club head at address position and at impact position. The known methods, however, often fail to produce predictable results due to inaccurate and inconsistent measuring of baseline loft and lie angles. As well, because most wood-type and hybrid clubs have rounded or curved soles, adjusting loft and lie angles unpredictably changes face angle; because the orientation of the club head at impact position has changed, the contact area between sole and ground at impact also changes and may force the club face open or closed, as opposed to square to the target, resulting in undesired hooking or slicing.

Hence, there remains a need for an accurate and repeatable system for hosel bending, and other methods of customizing the clubs for enhanced mass distribution.

SUMMARY OF THE INVENTION

The present invention is directed to an improved weighting system for wood-type and hybrid golf clubs that allows customization of mass characteristics. In addition, the present invention is directed to a method and apparatus for adjusting loft and lie angles in a more predictable manner and reducing the change to face angle when loft and lie angles are modified.

The present invention relates to a golf club head comprising a hosel and a body having a face, a sole, a crown and a skirt joining the face, sole and crown, wherein the sole contains three recesses serving as fixture locations for a loft/lie angle adjustment tool. These recesses correspond to connection recesses on a tool, such that the club head is held firmly in an upright position. Two recesses are located adjacent to the hitting face, one on the toe end of the sole and one on the heal end. Another recess is located on the tailing edge of the sole in a position that aligns with the center of the hitting face. A locking mechanism is provided between the tool and the club head to retain the club head fixedly to the tool during the adjustment.

In another embodiment of the present invention, a golf club head comprises a hosel and body having a face, a crown, a skirt, and a sole. At address position, said sole has a contact area or region located on the edge of the cutaway portion, toward the toe side of the downward projection of the center of gravity on the sole. Further, the sole of the club is slightly curved such that when the club head is placed on the ground, the toe edge and heel edge are located above the ground. In accordance with this embodiment, the lie angle of the club may be modified to be between about 44° and about 54° with no substantial shift in the position of the contact area of the sole.

The sole of the club head of the present invention may also include a raised, curved portion, or sphere segment, to serve as the contact area between the sole surface and the ground plane. As in the above-described embodiment, this contact area allows loft and lie angles of the club head to be modified without causing significant change to the face angle. Additionally, the sole may have a cutaway portion to create a multi-relief surface.

In yet another embodiment of the present invention, the sole further comprises pads, or areas of material that may be milled, polished, shaved, or otherwise extracted to create a multi-relief sole surface. In accordance with this embodiment, a number of milling pads of varying volume and/or density may be incorporated into the sole. For example, a first pad may be located near the leading edge and roughly aligned with the center of the hitting face, a second pad may be situated at the tailing edge and roughly aligned with the center of the hitting face, a third pad may be located toward the toe end, a fourth pad may be located toward the heel end, and a fifth pad may be situated between the toe end and the center of the sole. In accordance with this embodiment, the center of gravity of the club head can be adjusted by milling or extracting mass from the first, second, third and fourth pads. The contact area between the sole and the ground plane, and hence the face angle at address and impact positions, may be adjusted by milling or extracting mass from the fifth pad.

According to this aspect of the present invention, milling pads may also be disposed on the internal surface of a sole of a golf club head. Preferably, four milling pads are situated on the internal surface of the sole, one toward the face and heel, one toward the back and heel, one toward the face and toe, and one toward the back and toe. Similar to the previous embodiment, material may be removed from these milling pads to adjust the center of gravity of the club head.

A final embodiment of the present invention teaches a golf club head comprising a hosel and a body wherein the body contains a hollow interior volume for receiving a cartridge, as taught in parent U.S. patent. application Ser. No. 11/560,905, previously incorporated by referenced in its entirety, wherein the cartridge has a constant density and weight so as to maintain center of gravity in a neutral position when the cartridge is inserted into the body of the club head. As discussed in the parent application, the cartridge may also have varying density, e.g., a high density end and a low density end. Alternatively, the density may vary continually along its length.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

Figure 1:
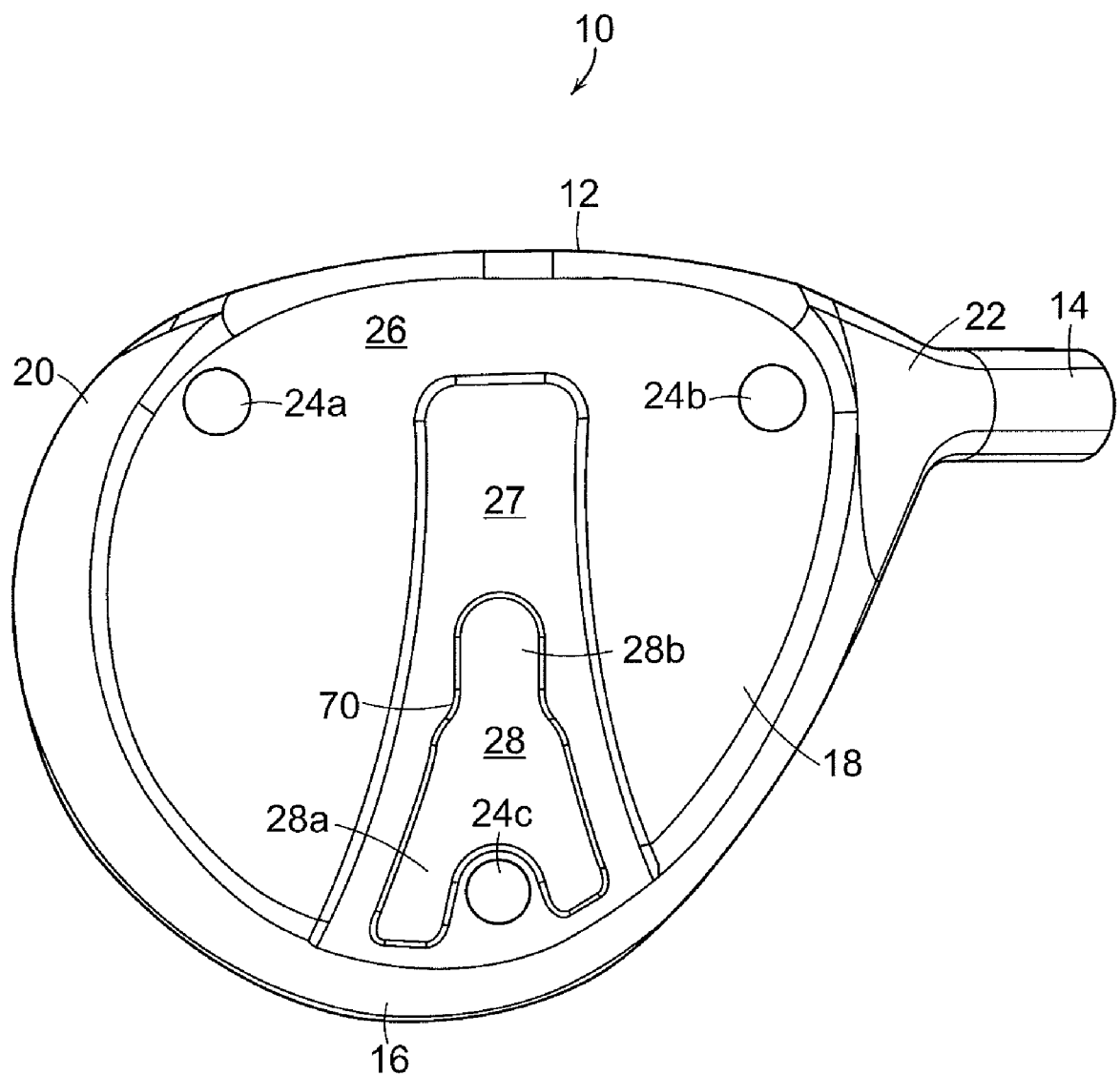
FIG. 1 is a bottom plan view of a club head of the present invention.
Figure 2:
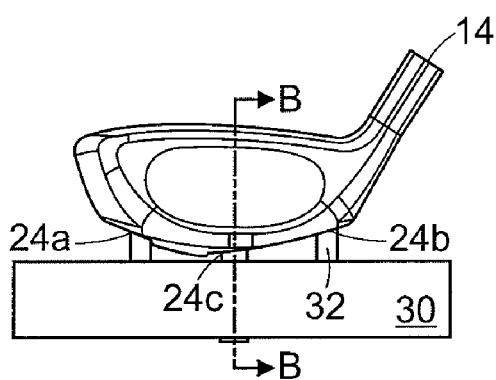
FIG. 2 is a front plan view of the club head of FIG. 1 attached to a tool.
Figure 3:
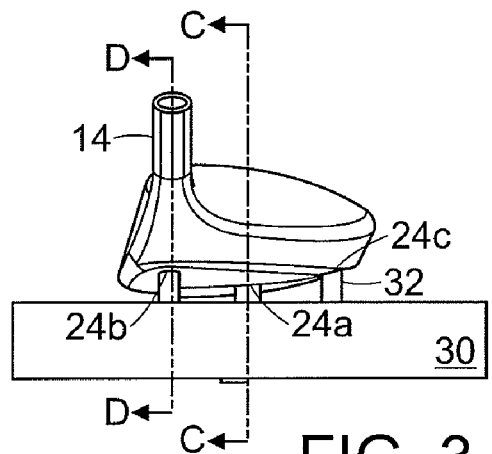
FIG. 3 is a heel side view of the club head of FIG. 1 attached to the tool of FIG. 2.
Figure 4:
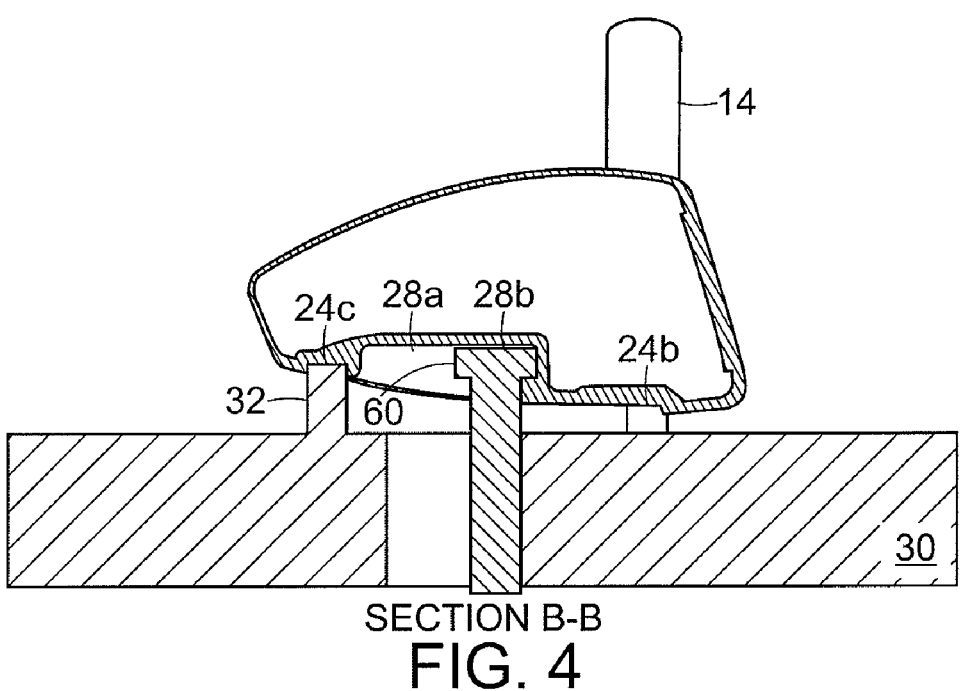
FIG. 4 is a cross-sectional view of the club head of FIG. 1, taken along B-B in FIG. 2, attached to the tool of FIG. 2.
Figure 5:
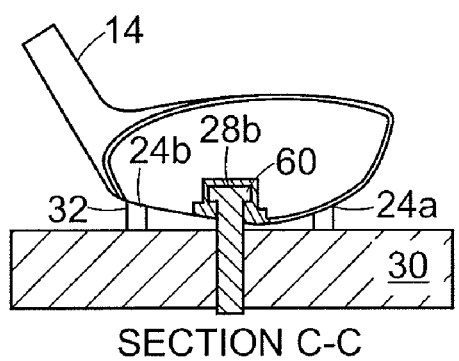
FIG. 5 is a cross-sectional view of the club head of FIG. 1, taken along C-C in FIG. 3, attached to the tool of FIG. 2.
Figure 6:
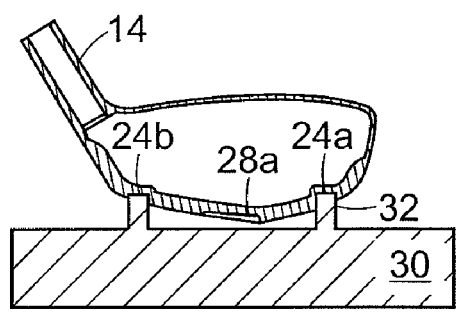
FIG. 6 is a cross-sectional view of the club head of FIG. 1, taken along D-D in FIG. 3, attached to the tool of FIG. 2.

In a first embodiment of the present invention, as illustrated in FIG. 1, golf club head 10 has hitting face 12, hosel 14, back 16, sole 18 and skirt 20. Sole 18 includes three attachment points 24a, 24b and 24c. As shown in FIGS. 2-6, attachment points 24a, 24b and 24c correspond to three posts 32 on tool 30. An example of tool 30 is shown in more detail in FIGS. 7 and 8 and is preferably a machine for bending the hosels of golf club heads and thereby modifying the lie and loft angles of golf club heads. According to this embodiment, a first attachment point 24a is located on sole 18 adjacent to hitting face 12 and toward toe 20, a second attachment point 24b is located on sole 18 adjacent to hitting face 12 and toward heel 22, and a third attachment point 24c is located toward back 16 of sole 18, roughly aligned with the center of hitting face 12. This configuration of three attachment points optimizes the stability of club head 10 as it rests on posts 32, as three is the minimum number of points required to define a plane. A configuration utilizing two attachment points would not provide sufficiently stability, as an additional point would be required to create a plane on which the club head could rest; four or more attachment points would be too cumbersome and would increase the likelihood that the attachment points of the sole would not meet precisely with the posts of the tool. Three attachment points, however, provide for a stable plane on which the club head may rest.

Figure 7:
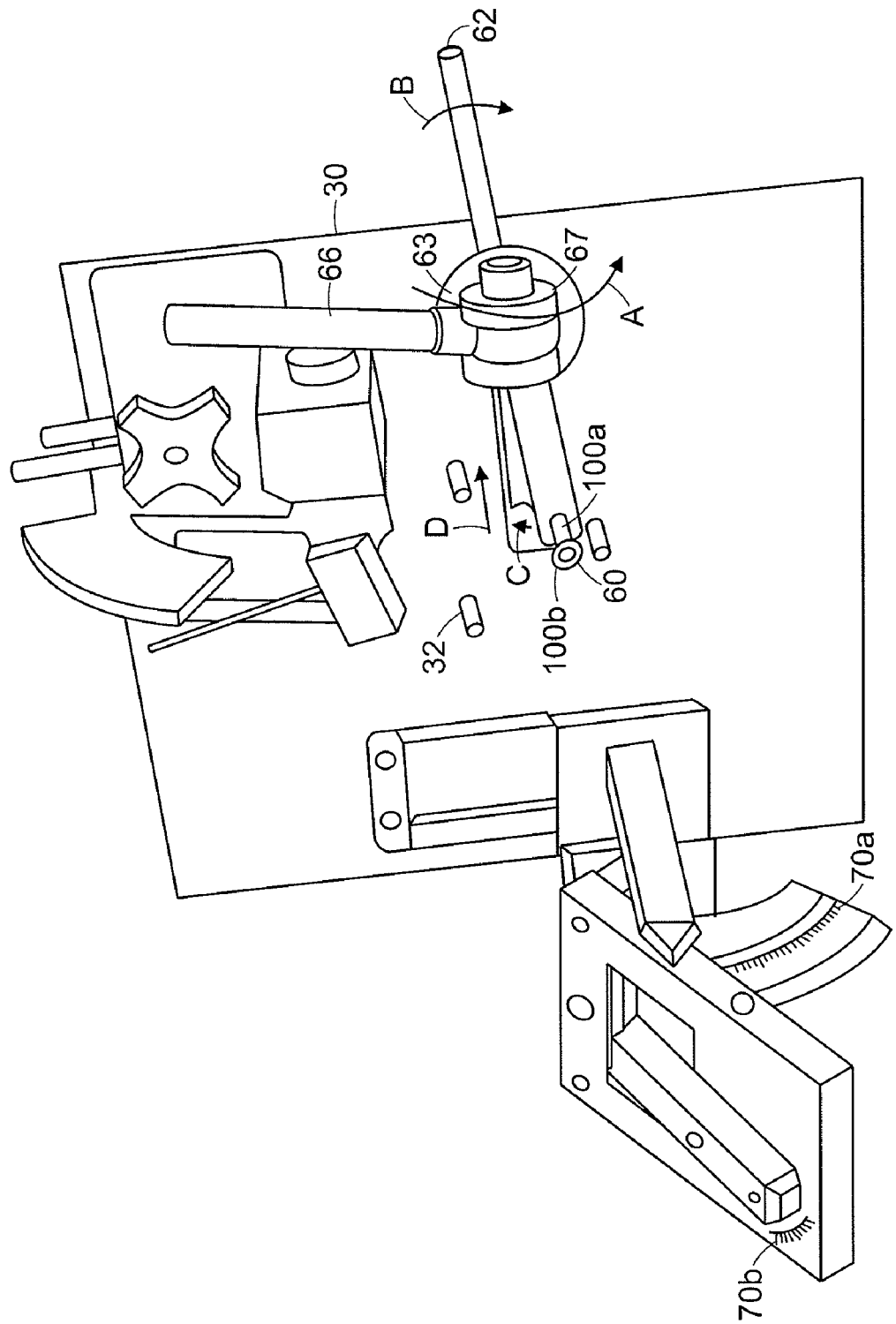
FIG. 7 is a top perspective view of the tool of FIG. 2.

As shown in FIGS. 2-6, club head 10 contacts three posts 32 of tool 30 at attachment points 24a, 24b and 24c. Attachment points 24a, 24b and 24c preferably comprise shallow cavities within the body of club head 10 into which posts 32 may be inserted and locked. As illustrated in FIGS. 1 and 4-6, sole 18 also includes cutaway portion 28, designed to receive locking arm 60 located on tool 30. As best shown in FIG. 1, beginning at the end closest to face 12 (or the proximal end), cutaway portion 28 consists of a narrow aperture 28b having a rounded edge and a constant width; moving toward the distal end, cutaway portion 28 becomes wider at neck 70, and continues to increase in width to form opening 28a. In this embodiment, attachment point 24c is located at opening 28a. As best shown in FIG. 7, locking arm 60 comprising upstanding stem 100a and enlarged head 100b. Locking arm 60 is disposed at one end of rotating arm 62 which is rotatably attached to tool 30 at pivot 63. Also attached to pivot 63 is lever 66. Lever 66 has cam surface 67 and as lever 66 is rotated along arrow A, cam surface 67 presses rotating arm 62 and locking arm 60 downward to allow locking arm 60 to retain club head 10, as described below. Opening 28a is wider then enlarged head 100b of locking arm 60, while narrow aperture 28b is narrower than enlarged head 100b but wide enough to accommodate stem 100a.

According to the first embodiment of the present invention, to retain/lock club head 10 to tool 30, attachment points 24a, 24b and 24c are received in posts 32 of tool 30. Enlarged head 100b of locking arm 60 is inserted into opening 28a of cutaway portion 28, said locking arm projecting from movable arm 62 of tool 30. For enlarged head 100a to enter opening 28a, movable arm 62 should be in position shown in FIG. 7. Movable arm 62 is then moved along arrow B to move locking arm 60 toward narrow aperture 28b to the locking position along arrow C. Subsequent to moving movable arm 62 to the engaged position, club head 10 is locked firmly in place on tool 30 by moving lever 66 along arrow A, thus pushing movable arm 62 downward along arrow D, thereby pulling enlarged head 100b downward to engage the sides of narrow aperture 28b to retain club head 10 to tool 30. Movable arm 62 is then in the locked position as shown in FIG. 8.

Attachment points 24a, 24b and 24c may coincide with cavities incorporated into the body of a golf club head in which weights are disposed to adjust the mass characteristics of the club head. This type of weighting system is described in parent U.S. patent application Ser. No. 11/560,905, previously incorporated herein by reference in its entirety.

Figure 8:
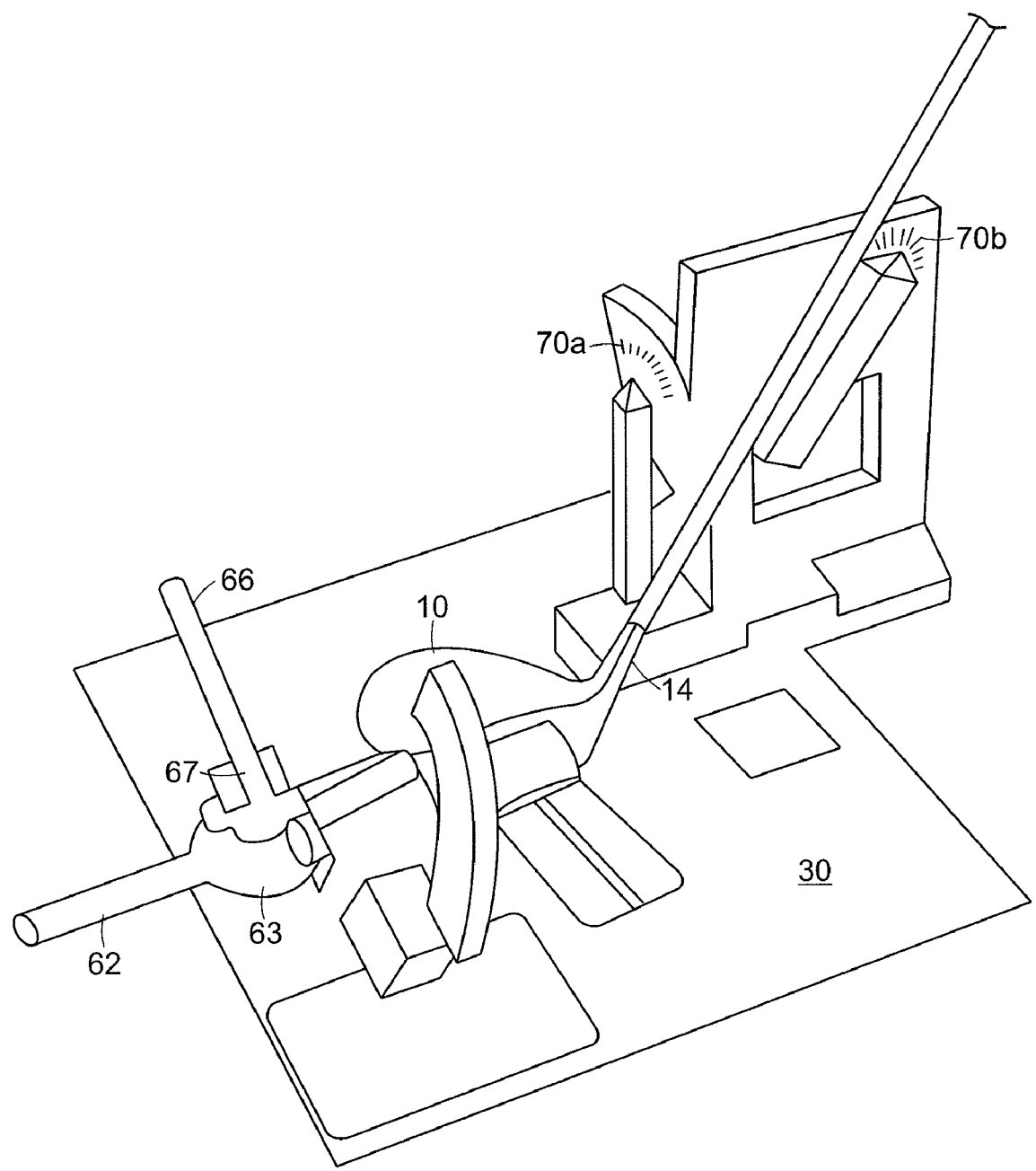
FIG. 8 is different top perspective view of the tool of FIG. 2 on which the club head of FIG. 1 is connected.

With club head 10 secured firmly to tool 30, as shown in FIG. 8, the loft and lie angles of club head 10 may be measured by reading hash marks 70a and 70b, respectively, to determine baseline values for those geometrical characteristics. Alternatively, tool 30 may include position sensors and a digital display to show loft and lie angles. After initial loft and lie angles are measured, tool 30 may be used to bend hosel 14 to adjust loft and lie angles to the desired amount. According to this aspect of the present invention, hosel 14 can be adjusted by a human operator or by a pneumatic device. Because attachment points 24a, 24b and 24c are configured to optimize the stability of club head 10 on tool 30, and because the attaching mechanism of posts 32 to attachment points 24a, 24b and 24c and locking arm 60 to narrow aperture 28b provides for a firm connection between club head 10 and tool 30, the operator of tool 30 is able to exercise greater control over the bending of hosel 14. Subsequent to the bending of hosel 14 and hence the adjustment of loft and lie angles of club head 10, the loft and lie angles may be measured again to determine the degree of adjustment that was just performed by comparing the new loft and lie angles to the baseline loft and lie angles. Club head 10 may be removed from tool 30 and reattached a later time to perform subsequent loft and lie angle measurements and adjustments. Attachment points 24a, 24b and 24c and cutaway portion 28 allow club head 10 to be connected to tool 30 in the same position at every instance of attachment. In this way, the measurements of loft and lie angles of club head 10 are consistent and repeatable, allowing for more precise modification of loft and lie angles.

Figure 9:
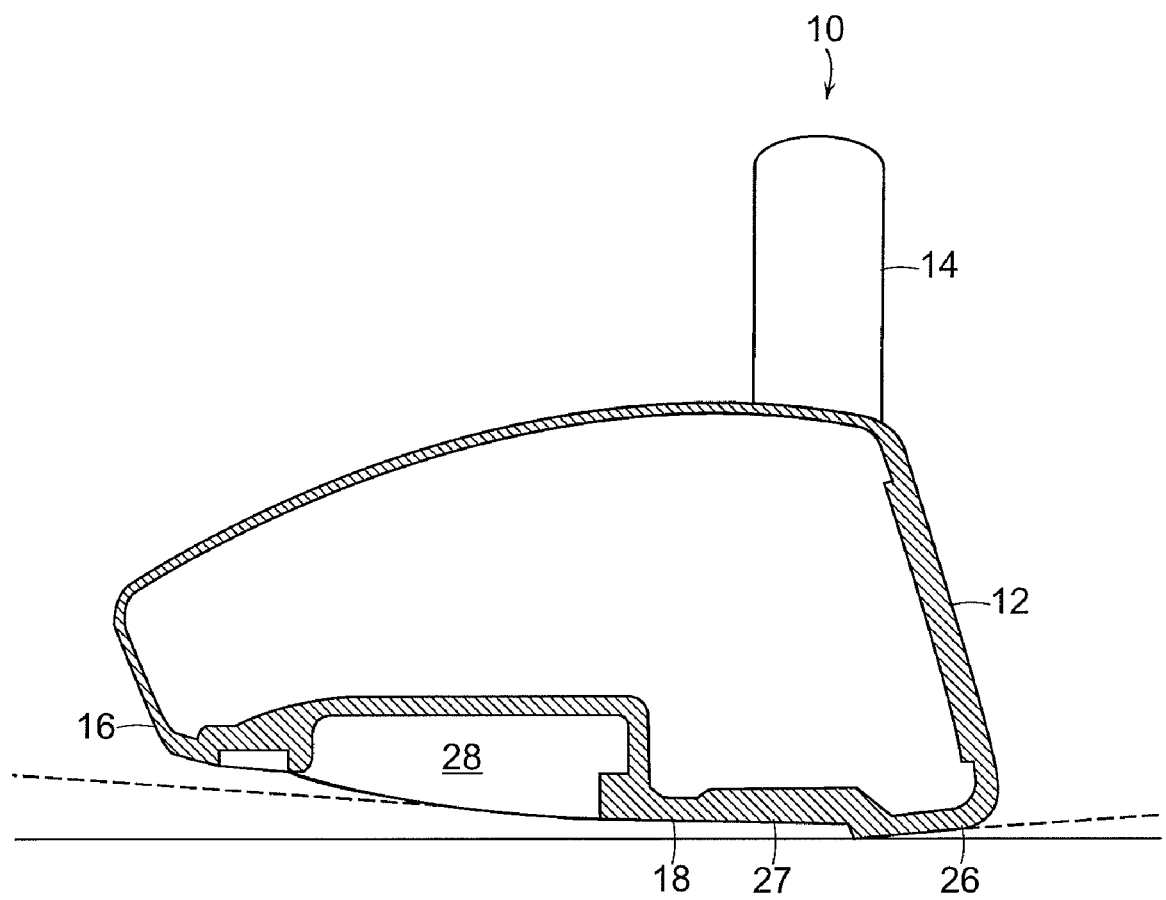
FIG. 9 is a cross-sectional view of the club head of FIG. 4 without the tool to show a multi-relief section.

Sole 18 of club head 10, as shown in FIG. 1, may also include negative relief portion 26 to create a multi-relief sole surface. FIG. 9 shows the varied relief of sole 18. Sole 18 is shown substantially along the portion that would strike the ground, and is divided into three relief sections: leading section 26 adjacent to hitting face 12, first relief section 27, which is higher off the ground than leading section 26, and cutaway portion 28, discussed above. It should be appreciated by those skilled in the art that these negative relief portions 26, 27 and 28 allow for greater ground clearance of sole 18 when club head 10 is at impact position, and strikes the ground to minimize potential drag with the ground.

First relief section 27 is raised off of the ground when club head 10 is at address position with leading section 26 resting on the ground and with face 12 square to the target. The tailing edge 16 of sole 18 is also raised up off of the ground when club head 10 is at address position with the face square to the target to provide for greater ground clearance and to prevent club head 10 from digging into the ground on the backswing. FIG. 9 shows the curved nature of the leading and tailing edges of sole 18. The solid line indicates the ground plane, on which leading section 26 rests; the broken lines indicate the angles at which the leading and tailing edges of the sole curve with respect to the ground plane during the swing.

Figure 10:
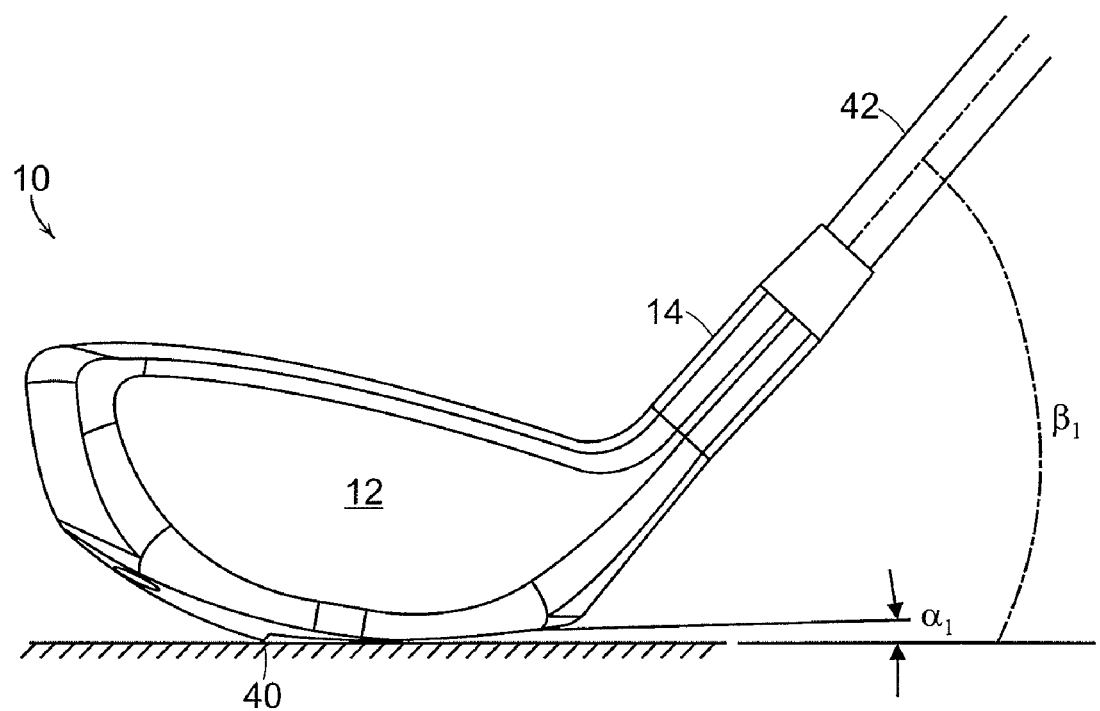
FIG. 10 is a front plan view of the club head of FIG. 9 showing the club head at address position and having a lie angle of $\beta_1$.
Figure 11:
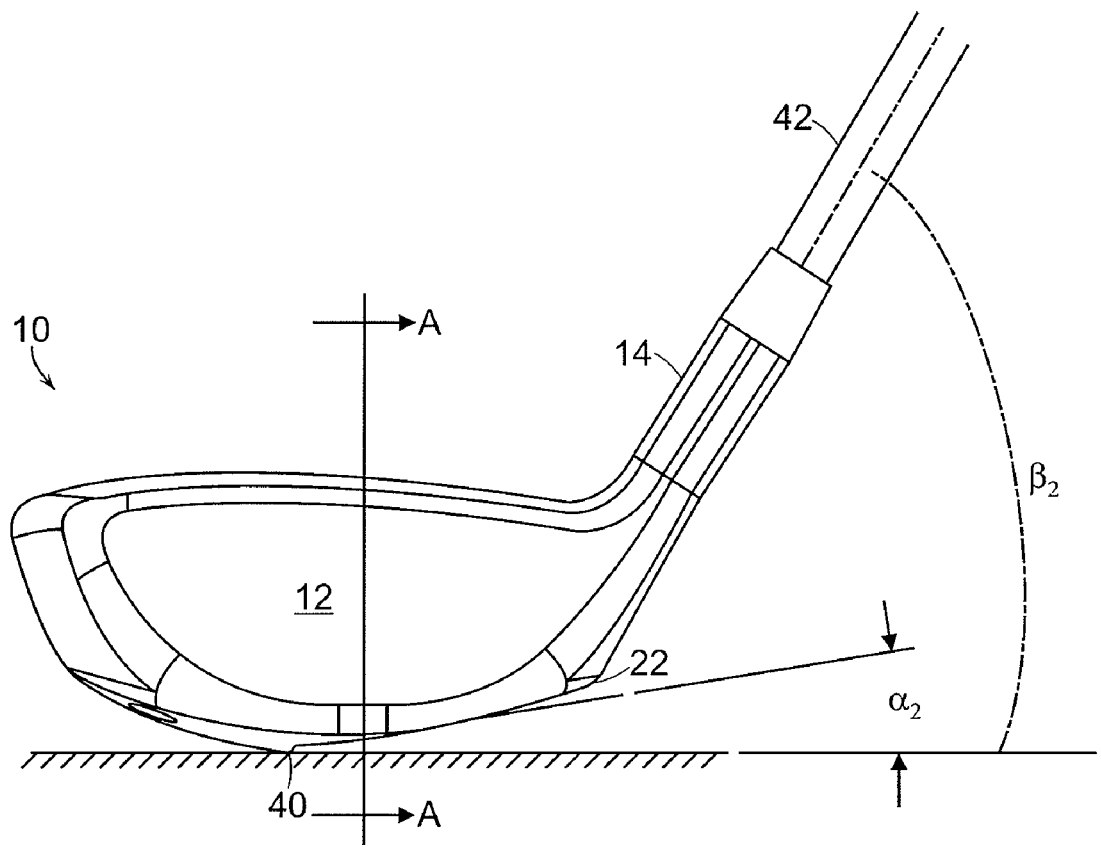
FIG. 11 is a front plan view of the club head of FIG. 9 showing the club head at address position and having a lie angel of $\beta_2$.

Referring to FIGS. 10 and 11, to minimize the opening or closing of the face angle when the hosel is adjusted to alter the lie and/or loft angles, a contact area 40 can be preset or predetermined so that contact area 40 provides an area or a point where club head 10 makes contact with the ground when the lie and/or loft angles are altered within a predetermined range. This sole design allows for face angle to remain substantially undisturbed when lie and/or loft angle is adjusted. Sole designs of the prior art generally provide for unpredictable face angle shift when lie and/or loft angle of the club is adjusted. Because most soles in the prior art are curved and without a preset contact area, the adjustment of lie and/or loft angle and the subsequent change in orientation of the club head at address position forces the original area on the sole where the club head meets the ground plane to change to a different area of the sole. This new contact area can cause the club head to open or close relative to the target, resulting in undesired hooking and slicing.

As shown in FIG. 10, contact area 40 meets the ground plane when club head 10 is at address position and face 12 is square to the target. In this configuration, shaft 42 creates a lie angle of $\beta_1$ with the ground plane. FIG. 11 shows club head 10 after hosel 14 has been bent to adjust the lie angle. Before bending, lie angle $\beta_1$ may be as small as about 44°. After bending, lie angle $\beta_2$ may be as large as about 55°. FIG. 11 shows that contact area 40 remains the location at which sole 18 meets the ground plane, even after the hosel has been bent to adjust lie angle. Because contact area 40 does not shift, club head 10 will meet the ground plane at address and impact positions at the same area as before the adjustment of lie angle, thereby preserving the face angle of club head 10. Further, adjustment of lie angle will force the angle formed between the ground plane and the invisible line between contact area 40 and the surface of the sole toward heel 22, labeled as $\alpha_1$ and $\alpha_2$ in FIGS. 10 and 11, respectively, to be altered. In accordance with this embodiment, $\alpha_1$, may be as small as 1° and $\alpha_2$ may be as large as 9°, with no significant change in location of contact area 40. For the same reasons, contact area 40 can also maintain a contact area with the ground when the loft angle is changed.

Figure 12:
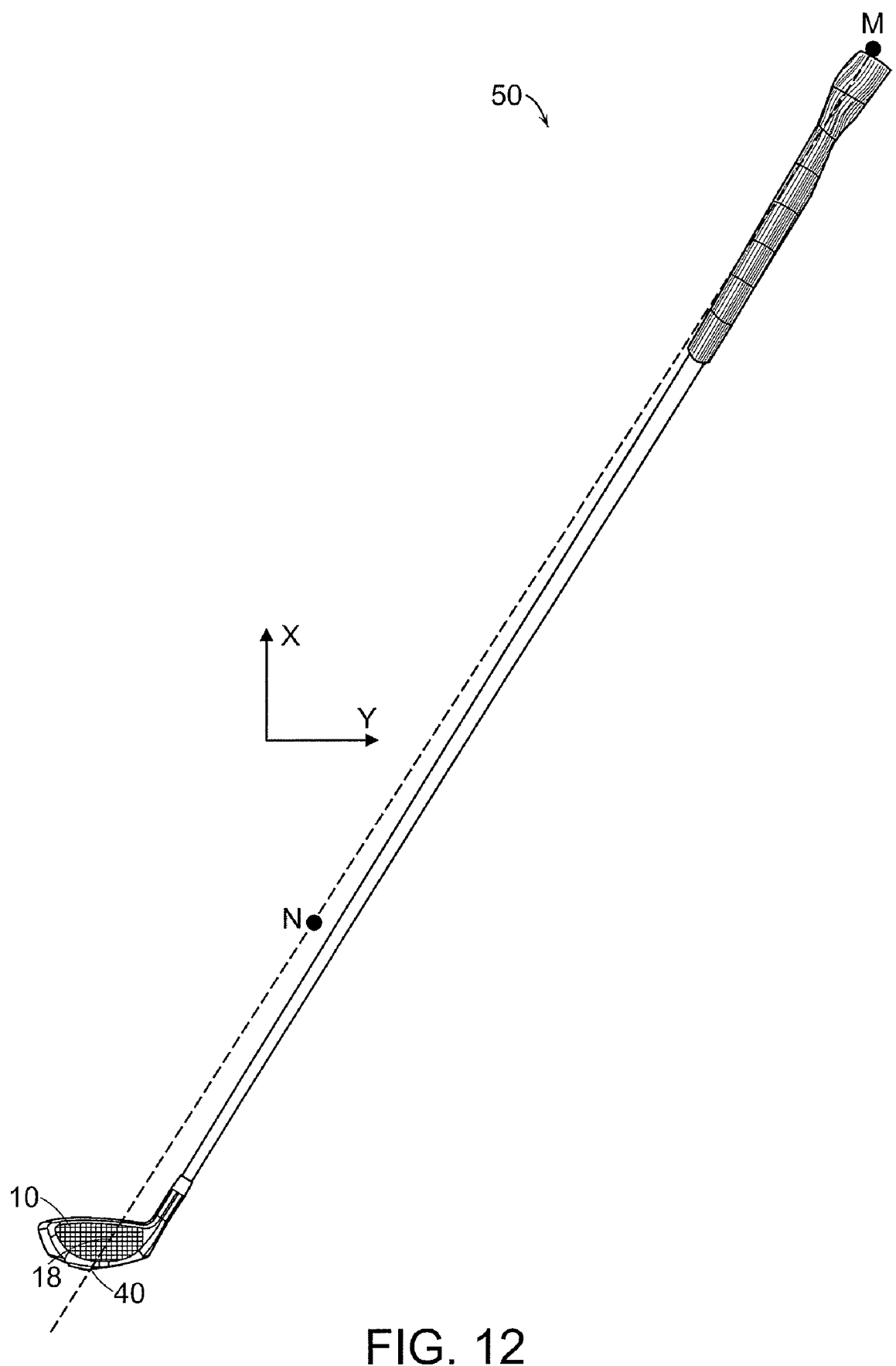
FIG. 12 is a front plan view of a golf club showing the position of the contact area of the sole in relation to the center of gravity of the club and the top of the grip.
Figure 13:
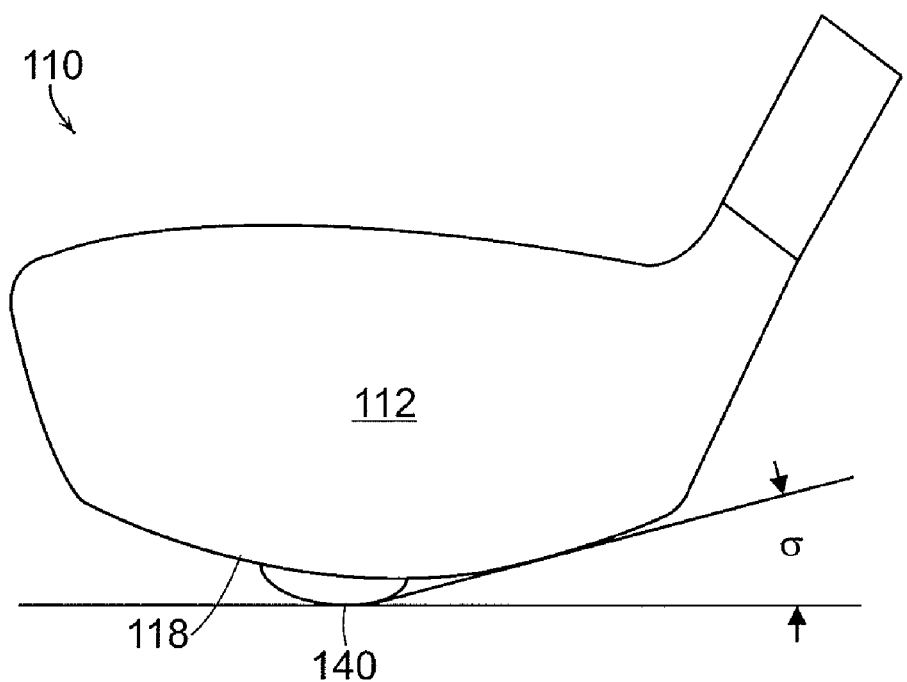
FIG. 13 is a front plan view of another golf club head of the present invention.
Figure 14:
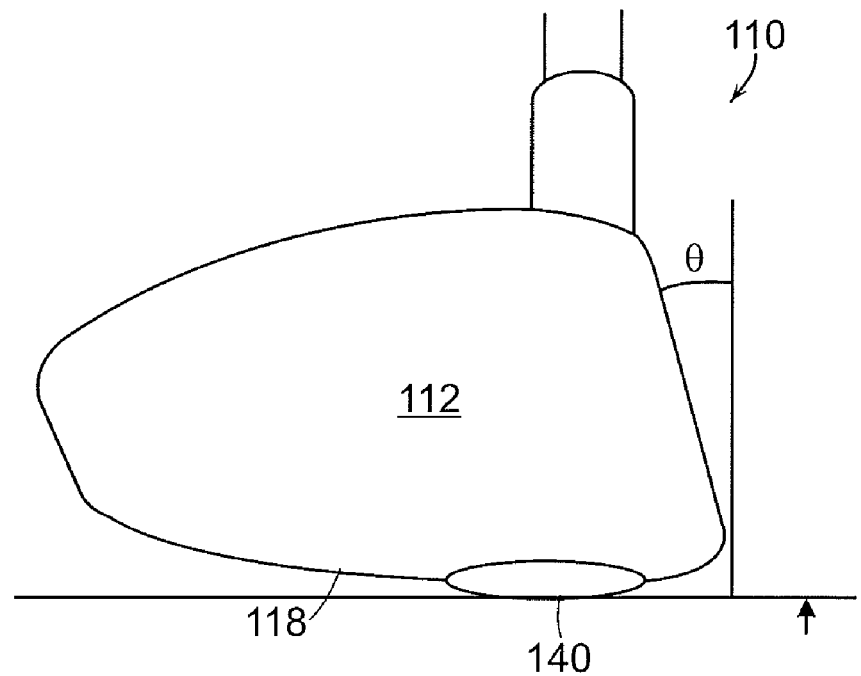
FIG. 14 is a toe-side view of the club head of FIG. 13.

According to another aspect of the second embodiment of the present invention and shown in FIG. 12, contact area 40 is located on sole 18 on or parallel to the X-Y plane that includes the point M at the top of grip 65 and the center of gravity of club 50, called point N. Contact area 40 may be on the line that includes M and N or may be toe-ward of the intersection of said line with sole 18. Preferably, contact area 40 is located closer to the toe of club head 10, and contact area 40 can be a contact area. This position helps to stabilize club 50 when it is supported by the hands of the golfer and is at rest in address position, as the center of gravity then behaves in a way similar to a ballast a of ship—it prevents the club from tipping or wobbling in the hands of the golfer.

In an alternative embodiment of this aspect of the current invention, shown in FIGS. 13-17, sole 118 of club head 110 includes contact area 140, comprising a sphere segment. Preferably, sphere segment 140 is located closer to the toe than to the heel. According to this embodiment and illustrated in FIGS. 16 and 17, the sphere segment comprising contact area 140 is located on or parallel to the X-Y plane that includes the point at the top of grip 165, called E, and the center of gravity of the club, called F. More particularly, contact area 140 is located either on the line that includes E and F, which exists in plane X-Y, or toe-ward of the intersection of line E-F with sole 118 and parallel to plane X-Y. Due to the position of the sphere segment, the angle created by contact area 140 and the surface of the sole with the ground plane, called $\sigma$ in FIG. 13, can be adjusted to be between about 1° and about 9° with minimal change in face angle. The adjustment of this angle allows the lie angle of the club head to be between about 48° and about 57° without causing significant modification to face angle. This sole design also allows loft angle, called $\theta$ in FIG. 14, to be modified. Club head 110 may be lofted or delofted by about 2°, again with substantially no change in face angle.

Figure 15:
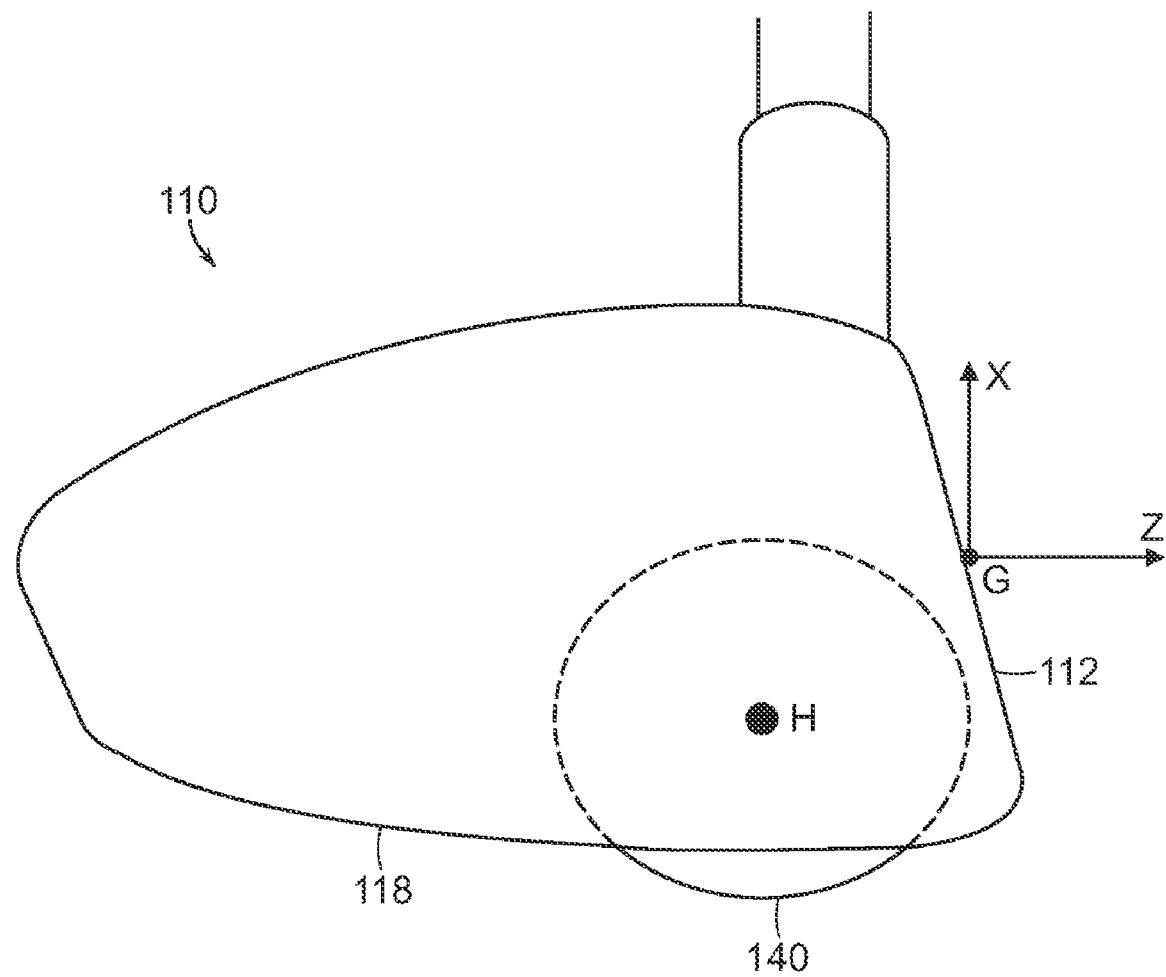
FIG. 15 is a toe-side view of the club head of FIG. 13 showing the position of the sphere segment in relation to the center of the club face.
Figure 16:
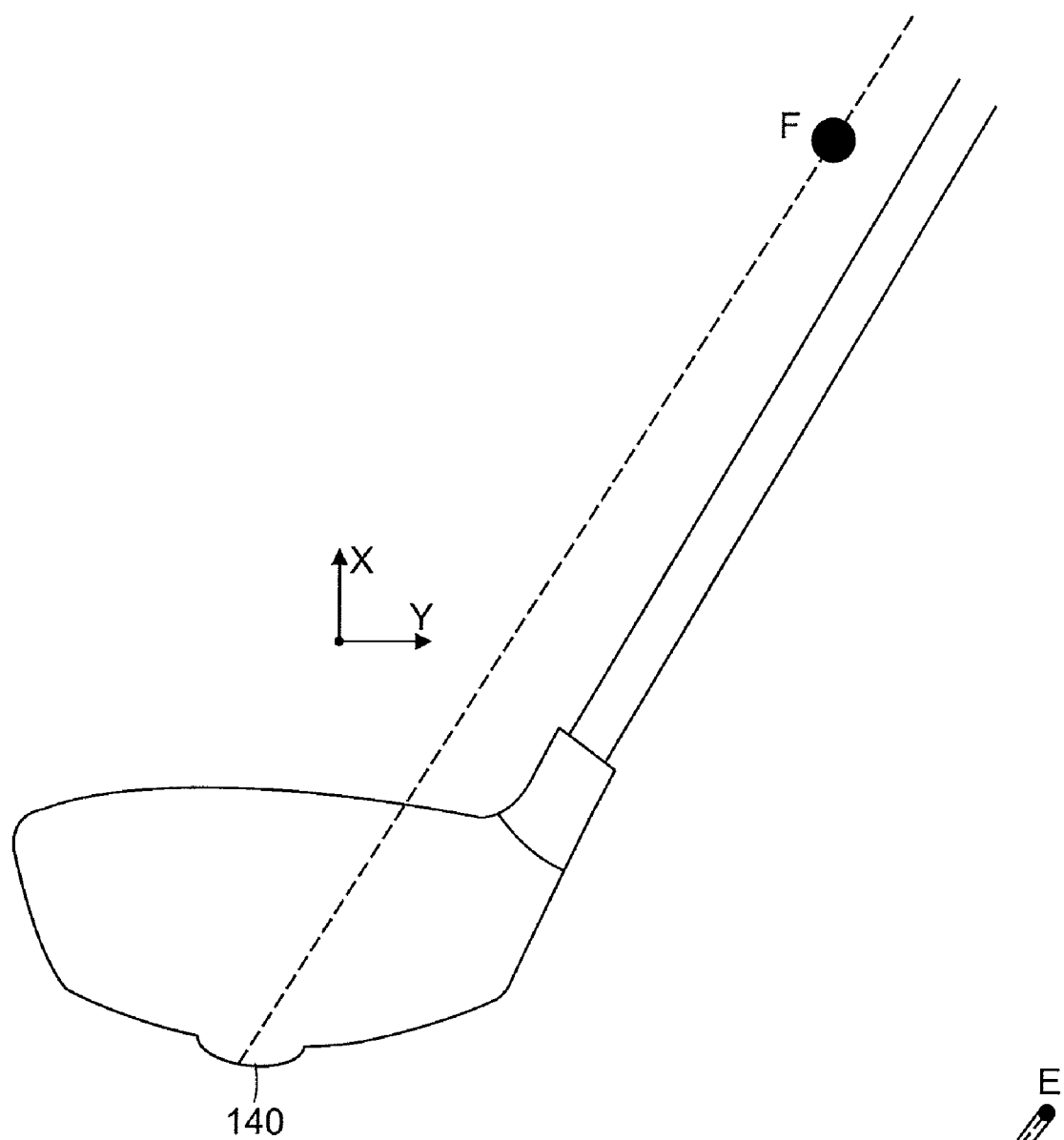
FIG. 16 is a front plan view of the head and part of the shaft of a golf club showing the position of the contact area of the sphere segment in relation to the center of gravity of the club.
Figure 17:
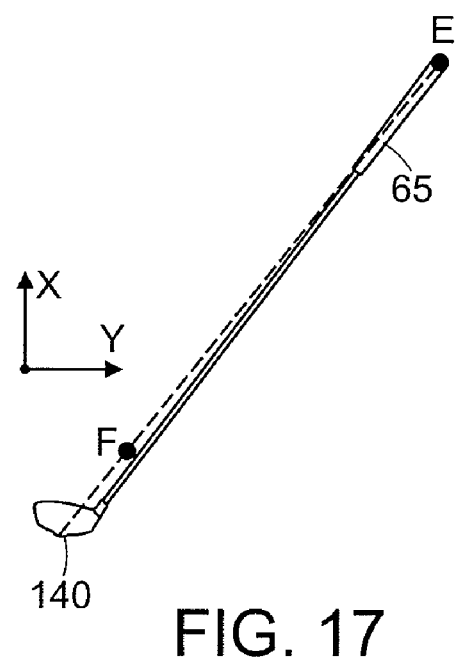
FIG. 17 is a full front plan view of the golf club of FIG. 16 showing the position of the contact area of the sphere segment in relation to the center of gravity of the club and the top of the grip.

FIG. 15 illustrates an exemplary method for constructing the sphere segment of contact region 140. The distance from the geometric center of hitting face 112, called G, and the center of the sphere defined by the sphere segment 140, called H, in the Y direction is 0.48 mm toward the toe of the club head. The distance between G and H in the X direction is 7.61 mm toward the sole of the club head, and the distance in the Z direction is 26.13 mm away from the face of the club head. Table 1 below shows the changes in face angle of the inventive club 110 and a conventional club of the prior art, in this case the Titleist 907D2 driver, when both clubs are lofted and delofted.

TABLE 1

| Lofted Value (+ lofted, − delofted) | Exemplary conventional club Face Angle Change (+ closed, − open) | Inventive club Face Angle Change (+ closed, − open) |
|---|---|---|
| −2° | −2.61° | −0.01° |
| 0° | −0.01° | 0.01° |
| 2° | 2.53° | 0.04° |

Figure 18:
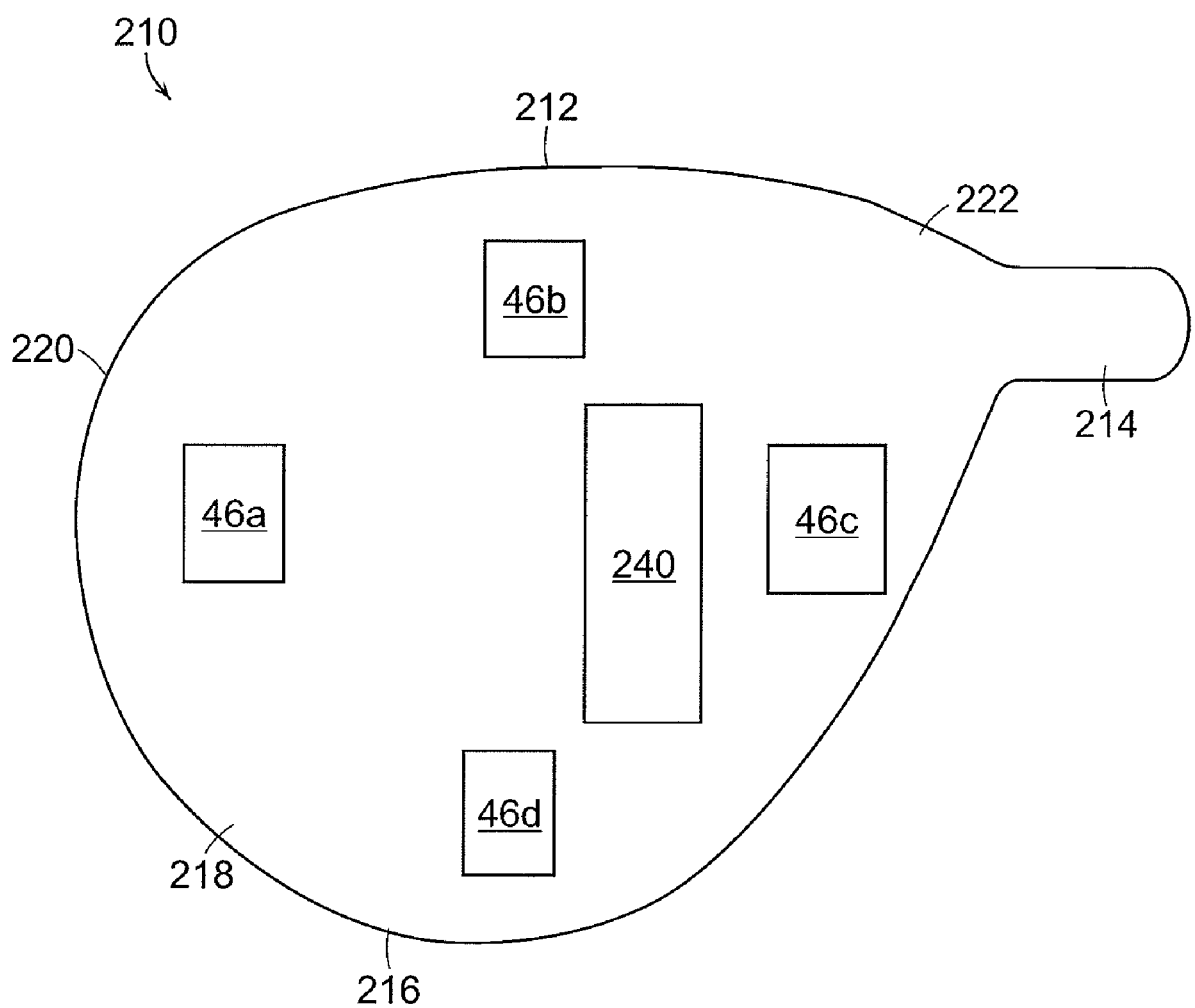
FIG. 18 is a bottom plan view of a club head of the present invention showing milling pads incorporated into the sole of the club head.

A fourth embodiment of the present invention is depicted in FIG. 18 and presents sole 218 of golf club head 210, wherein pads 46a, 46b, 46c and 46d and pad 48 are incorporated into sole 218. Pads 46a-d and pad 240 are composed of material that may be milled, polished, shaved or otherwise extracted after initial manufacture of golf club head 210 in order to vary the relief of sole 218 and to adjust mass characteristics of club head 210. According to an aspect of this embodiment, pads 46a-d and pad 240 may be made of aluminum, stainless steel, carbon steel, titanium, titanium alloy, or other metals or composites. Preferably, pad 46a is located toward toe 220 and roughly centered between the edge of hitting face 212 and tailing edge 216. Pad 46b is preferably located adjacent to the edge of hitting face 212 and roughly centered between toe 220 and heel 222. Pad 46c is preferably located toward heel 222 and roughly centered between the edge of hitting face 212 and tailing edge 216. Pad 46d is preferably located adjacent to tailing edge 216 and roughly centered between toe 220 and heel 222. The surfaces of pads 46a-d may have individual areas between 100 mm$^2$ and 1000 mm$^2$. The depths of pads 46a-d may be between 1 and 15 mm.

By extracting material from pads 46a-d, the mass characteristics of club head 210 may be adjusted. Particularly, the center of gravity of club head 210 may be shifted toward the toe 220, heel 222, hitting face 212 or tailing edge 216 by strategically removing material from pads 46a-d. Players may choose the particular specifications of pads 46a-d depending on their needs and playing styles. Further, players may choose to have sole 218 customized by having pads 46a-d and pad 240, or the recesses left behind by the milling of the pads, painted or engraved.

Figure 19:
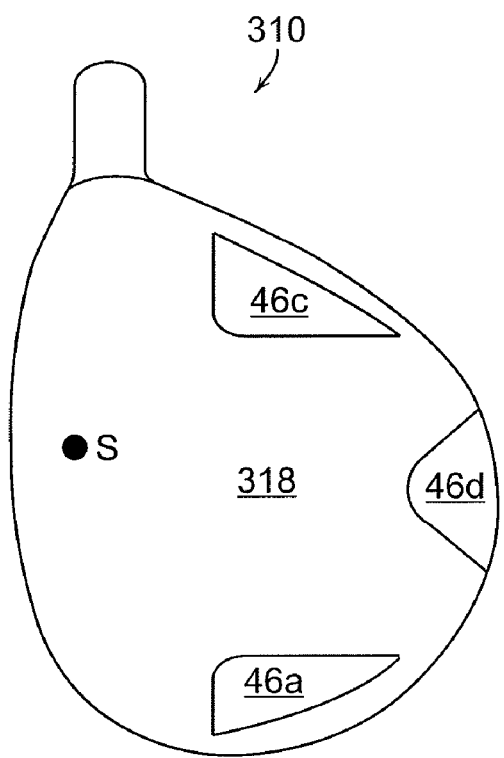
FIG. 19 is a bottom plan view of a club head of the present invention showing another configuration of milling pads incorporated into the sole of the club head.
Figure 20:
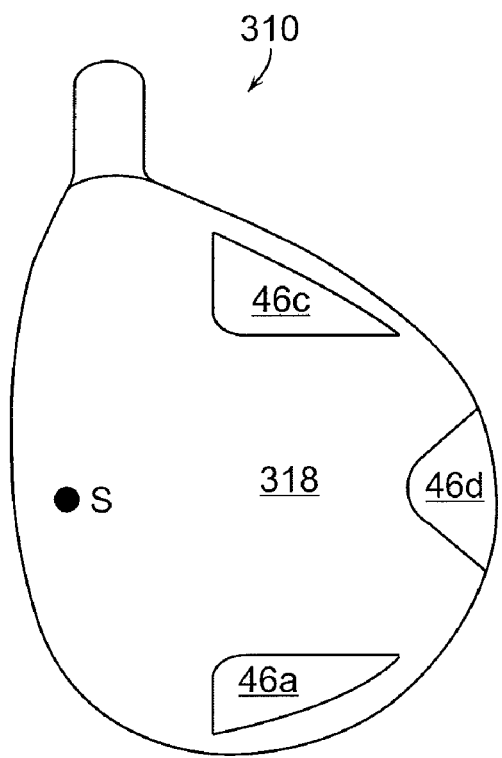
FIG. 20 is another bottom plan view of the club head of FIG. 19 in which material from a milling pad has been extracted.

The sole of the current embodiment may include any combination of pads 46a, 46b, 46c, 46d or 240. Pads 46a-d are preferably rectangular in shape, but may have any suitable shape for milling, polishing, shaving, or otherwise extracting material. FIGS. 19 and 20 show an example of a club head according to this aspect of the current embodiment. Sole 318 of club head 310 includes pads 46a, 46c and 46d. In FIG. 19, all of the pads are left intact, with no material having been extracted. This configuration provides for center of gravity S to remain neutral. In FIG. 20, pad 46c has been milled, causing center of gravity S to shift toe-ward.

In accordance with another aspect of the current embodiment, pad 240 as shown in FIG. 18 is preferably located toward toe 220, between 1.0 and 1.5 inches from the toe edge of sole 218, and roughly centered between hitting face 212 and tailing edge 216. Pad 240 preferably has a length between 20 and 40 mm and a width between 5 and 15 mm. Pad 240 preferably takes the shape of a rectangle, but may take any suitable shape for milling, polishing, shaving or otherwise extracting material. According this embodiment of the present invention, the main purpose of pad 240 is to adjust or set the contact area of sole 218 after lie and loft angles have been adjusted through the bending of hosel 214. Pad 240 functions similarly to contact areas 40 and 140 described above. After lie and loft angles are modified, the orientation of club head 210 at address position may be altered significantly, causing sole 218 to meet the ground plane at an area other than the intended contact area. This shift in contact area may cause hitting face 212 to become open or closed relative to the target. To maintain the original contact area or to ensure that sole 218 meets the ground plane in a manner that allows hitting face 212 to be square to the target at address position, pad 240 may be milled or otherwise have material removed to force the contact area into the desired location.

Figure 21:
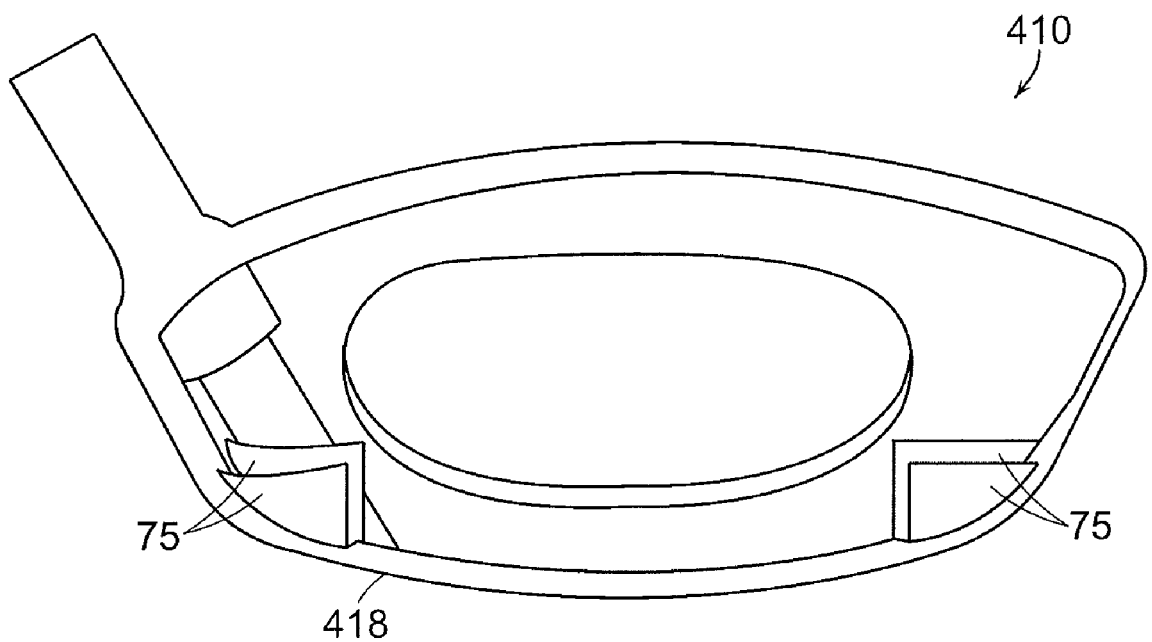
FIG. 21 is a cross-sectional view of a club head of the present invention showing milling pads disposed onto the internal surface of the sole of the club head.
Figure 22:
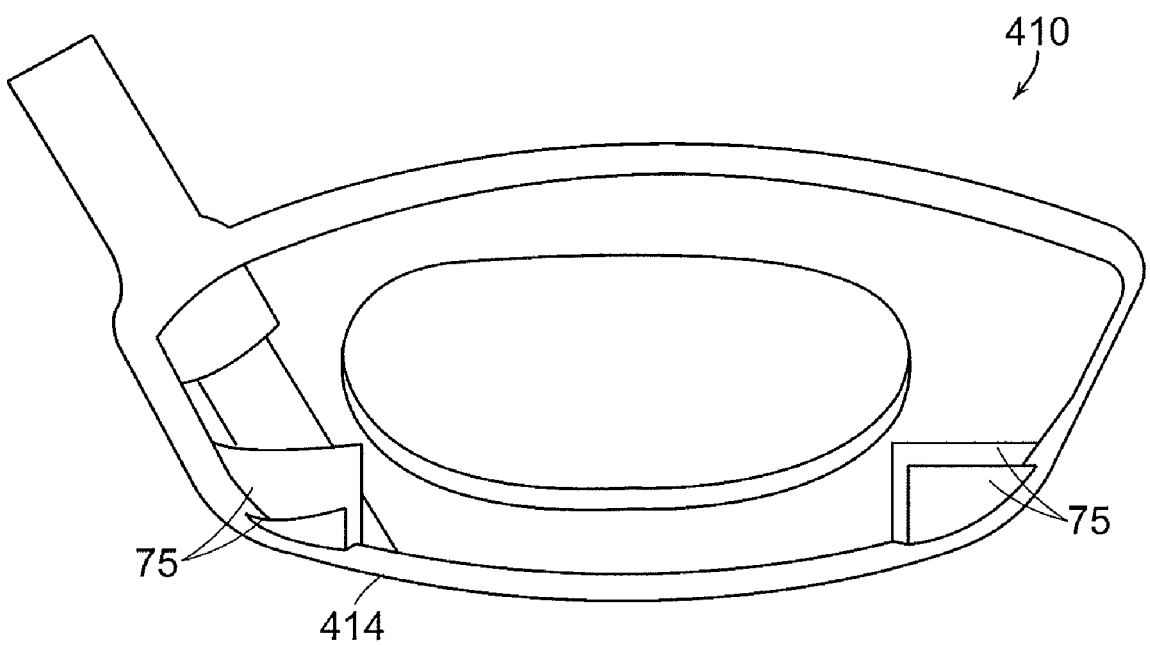
FIG. 22 is another cross-sectional view of the club head of FIG. 21, in which material from a milling pad has been extracted.

A fifth embodiment of the present invention provides for pads of milling material to be disposed on the internal surface of the sole of a hollow-body golf club, as illustrated in FIGS. 21 and 22. In this example, golf club head 410 includes four pads 75, one pad located toward the face and heel, one pad located toward the back and heel, one pad located toward the face and toe, and one pad located toward the back and toe. It should be noted that a golf club of the current embodiment may include one to four pads, disposed to any location on the inner surface of the sole. Pads 75 may be made of aluminum, stainless steel, carbon steel, titanium, titanium alloy, or other metals or composites, and may be ground, shaved, milled, or otherwise have their material extracted through an opening, such as a hitting face opening, before the hitting face insert is welded to the club head, in order to adjust the center of gravity of club head 410.

Figure 23:
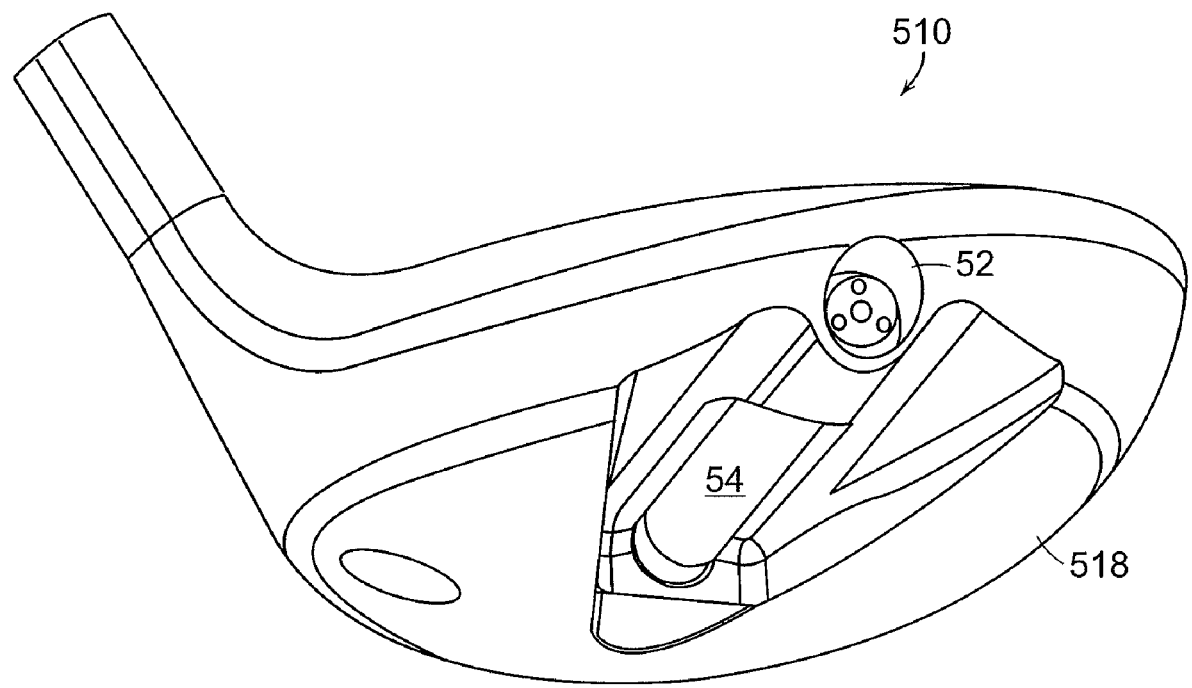
FIG. 23 is a bottom perspective view of another golf club head of the present invention.
Figure 24:
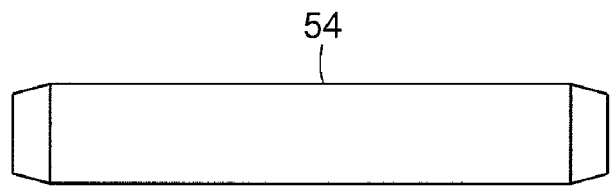
FIG. 24 shows a cartridge that is a component of the club head of FIG. 23.

A sixth embodiment of the present invention relates to a customizable weighting system as taught in previously incorporated parent U.S. patent application Ser. No. 11/560,905. In one embodiment of the '905 application, a golf club head has a coordinate system such that an x-axis is located horizontal to the club face, a y-axis is located vertical to the club face, and a z-axis is runs through the club face. As illustrated in FIGS. 23-24, the club head includes a hollow interior volume 52 constructed to accommodate a cartridge 54 having the shape of a cylinder or tube. Said cartridge comprises one higher density mass disposed to one end of the cartridge, creating a cartridge having a heavy end and a lighter end. Said cartridge may be placed in the hollow interior volume of the club head, preferably angled downward toward the face of the club head by at least 3 degrees from a z-axis, with the heavy side toward the club face, effectively decreasing the moment of inertia of the club head and shifting the center of gravity downward, in the y-direction. Alternatively, said cartridge may be placed with the lighter side toward the club face, increasing the moment of inertia of the club head and shifting the center of gravity upward in the y-direction.

The following table provides a summary of the change in mass characteristics, specifically center of gravity and moment of inertia, of a CAD-modeled club head and a number of prototype club heads depending on the position of the weighted cartridge within the hollow cavity of the club head. The label "Weight forward" refers to a club head in which the cartridge is place with the heavier or weighted side toward the face of the club, while "Weight back" refers to a club head in which the cartridge is placed with the lighter side toward the face of the club.

TABLE 2

| | $CG_y$ from ground (inch) | $CG_x$ from geometric center (inch) | $CG_y$ from geometric center (inch) | $I_x$ (kg * mm$^2$) | $I_y$ (kg * mm$^2$) | $I_{shaft\ axis}$ (kg * mm$^2$) |
|---|---|---|---|---|---|---|
| CAD prediction | | | | | | |
| Weight forward | 0.689 | 0.047 | −0.063 | 124 | 232 | 372 |
| Weight back | 0.705 | 0.047 | −0.047 | 137 | 247 | 406 |
| Club head 1 | | | | | | |
| Weight forward | 0.697 | 0.055 | −0.037 | | | |
| Weight back | 0.717 | 0.051 | −0.020 | | | |
| Club head 2 | | | | | | |
| Weight forward | 0.701 | 0.079 | −0.030 | 121 | 229 | 387 |
| Weight back | 0.713 | 0.071 | −0.016 | | 242 | 423 |
| Averages of 4 club heads | | | | | | |
| Weight forward | 0.701 | 0.051 | −0.047 | 122 | 227 | 385 |
| Weight back | 0.717 | 0.047 | −0.032 | 131 | 239 | 423 |

The table shows that, of the club heads for which there is data, moment of inertia in the x-direction, y-direction, and about an axis defined by the shaft of the club, increases when the weighted cartridge is inserted with the weight toward the back of the club, relative to the weighted cartridge positioned with the weight toward the face. For all club heads, the "weight forward" position results in a shift of the center of gravity toward the ground plane, or downward in the y-direction. The shift in center of gravity in the horizontal, or x-direction, is minimal for each club head. Alternatively, the density of cartridge 52 may vary in other ways, e.g., continually varying density instead of a heavy end and a lighter end.

Club head 510 of the present invention, as shown in FIG. 23, includes a body having a hollow cavity or sheath 52 in which a cartridge 54 may be inserted or removed. According to this embodiment, cartridge 54, shown in detail in FIG. 24, has a constant density and weight. Cartridge 54 may be composed of tungsten, aluminum, titanium or any other suitable material. Relative to a club head in which a cartridge of the '905 application and as described above is inserted, when inserted into club head 510, cartridge 54 allows the center of gravity of club head 510 to remain neutral. Other mass characteristics of club head 510, however, including moment of inertia, may be modified by the insertion of the cartridge into sheath 52. Preferably, the moment of inertia of club head 510 is increased upon the inclusion of cartridge 54 into sheath 52 relative to the moment of inertia of the club head without cartridge 54. In accordance with this embodiment, cartridge 54 is preferably exposed through sole 518, as illustrated in FIG. 23.

While various descriptions of the present invention are described above, it should be understood that the various features of each embodiment could be used alone or in any combination thereof. Therefore, this invention is not to be limited to only the specifically preferred embodiments depicted herein. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

We claim:

1. A golf club having a shaft, a grip, a hosel and a club head, the club head comprising:
    a body having a face, a sole, a crown and a skirt joining the face, sole and crown, wherein the sole has a varying relief closer to a toe of the club head and wherein the sole meets the ground plane at one predetermined contact area, wherein said contact area is located on or toe-ward of the line that projects from the tip of the grip through center of gravity of the club
    wherein the contact area comprises a sphere segment disposed to the sole, and
    wherein the body has a coordinate system with an y-axis located horizontal to the club face, a x-axis located vertical to the club face, and a z-axis located through the club face, and
    wherein the sphere segment is located on the sole such that the center of the sphere defined by the sphere segment is located away from the geometric center of the face of the club head by about 0.5 mm in the y-direction toward the toe of the club head, about 7.5 mm in the x-direction toward the sole of the club head, and about 26 mm in the z-direction away from the face of the club head.

2. The golf club of claim 1, wherein the angle formed by the line extending from the contact area to the surface of the sole on the heel side of the contact area and the ground plane is between about 1 and about 9 degrees.

3. The golf club of claim 1, wherein the sole remains in contact with the ground on said predetermined contact area over about a 10-degree range of lie angle positions.

4. The golf club of claim 1, wherein the contact area can be partially removed from the club head to vary its location.

5. The golf club of claim 1, wherein the club head is lofted or delofted by up to 2° without substantially changing the face angle of the club head.

* * * * *